No. 864,748. PATENTED AUG. 27, 1907.
H. WITTMAN.
SHOPPING CARD AND ENVELOP.
APPLICATION FILED AUG. 7, 1905.

UNITED STATES PATENT OFFICE.

HUGO WITTMAN, OF BUFFALO, NEW YORK.

SHOPPING-CARD AND ENVELOP.

No. 864,748.     Specification of Letters Patent.     Patented Aug. 27, 1907.

Application filed August 7, 1905. Serial No. 273,046.

*To all whom it may concern:*

Be it known that I, HUGO WITTMAN, a citizen of the United States, residing at Buffalo, in the county of Erie and State of New York, have invented new and useful Improvements in and Relating to Shopping-Cards and Envelops, of which the following is a specification.

It is now the custom in many of the large department stores to furnish a purchaser with a shopping card when it is his intention to buy at more than one department. Upon this card each sales-clerk makes entry of the article and amount of the sale he has made, and when the purchaser has completed his purchases, he presents the shopping card to the cashier for settlement. This enables the customer to pay for all his purchases at one time.

Another custom that has become very common in retail stores is for each clerk to make out a bill of sale in duplicate, one copy of which is retained and the other given to the trader as his receipt or memorandum of the sale. The use of the duplicate sales bill or memorandum together with the shopping card has been attended with more or less inconvenience and annoyance, both to the sales-clerk and to the trader.

My invention has for its object to combine in connection with a shopping card an envelop or receptacle in which may be placed the ordinary sales bills or memoranda; and it consists further in combining with such an envelop and shopping card a series of stickers each bearing a number corresponding with the number of the shopping card.

In the accompanying drawings, Figure 1 is a face view of a combined envelop and shopping card embodying my invention. Fig. 2 is a view of the reverse side of the same.

In the drawings A represents a pocket or envelop which may be of any desired size and B represents a shopping card attached to the envelop or pocket. The card forms the flap of the envelop and is of a size approximating the size of the envelop, though this relation of size is not material. The shopping card on its face is printed and ruled in any convenient manner. I have shown it as being provided with spaces to receive entries indicating 10 separate sales. For each sale is a space to receive the number of the clerk making the sale, the amount of the purchase, and the number of the sales bill or memorandum. This part of the shopping card is duplicated, as indicated at 2, 3. Each shopping card bears a number, the number indicated in the drawings being 15,001. Attached to the envelop is a series of stickers, C, or separable gummed pieces of paper each bearing a number identical with the number of the shopping card. There are preferably as many of these stickers as there are spaces for entry on the shopping card.

The manner of using my invention is as follows: A customer desiring to purchase from different counters or departments is furnished with one of the envelops and cards. On making the first purchase an entry of the sale is made upon the portion 2 of the card. The sales-clerk also makes out the usual sales bill or memorandum in duplicate and places the memorandum that is to be retained at the store in the envelop or pocket A. Upon the other bill is pasted one of the stickers C and this goes with the goods to the wrapper and thence to the delivery department. This method of procedure is repeated as often as a sale is made, and finally the purchaser presents the card to the cashier for settlement. In the meantime the various bundles each bearing a sticker with a number identical with that of the sales card have been forwarded to the delivery department where the similarity of numbers shows that the several packages are to be delivered at one address.

As has been stated, the card is furnished with duplicate portions 2, 3. One of them, as 2, is filled out at the time of making the sales. The other, 3, is filled out by the book-keeper or cashier to correspond with the entries on the part 2. On the back or reverse side of one portion of the shopping card, preferably the part 2 upon which the original entries are made, are spaces for the date of the sale and the name and address of the purchaser, and for any directions for shipping and the like. This part of the shopping card is removed and is sent to the delivery or shipping clerk who, from the directions on such reverse side, receives his information as to the delivery of the packages containing the stickers numbered 15 corresponding with the portion of the card he has received. The other portion of the card may be retained at the store. On its back or reverse side may be printed any information desired.

I prefer that a portion, 4, of the card should be easily separable from the envelop and from the parts 2, 3, and be arranged to serve as a voucher. It bears a number identical with the number appearing on the other parts of the card and on the stickers.

It will thus be seen that in combination with and attached to the pocket or envelop is a shopping card arranged to receive the entries as they are made; that there is also attached to the envelop a voucher, and as a preferred form of my invention the sale-entry part of the shopping card is printed in duplicate so that one part can be given to the shipping clerk or to the purchaser and the other retained by the cashier.

What I claim as my invention is:

1. A shopping card provided with a pocket secured thereto, the said shopping card comprising two sections, each having appropriately designated spaces for an account and provided with a designating mark, one of said sections having printed on its back spaces designated to receive the purchaser's name and address and shipping directions, a voucher, and a series of gummed stickers, the said voucher and stickers bearing the same designating mark as the shopping card, substantially as set forth.

2. The combination of a pocket, a shopping card secured thereto and formed of two duplicate sections, each section bearing the same distinguishing mark, and a series of stickers each bearing the same distinguishing mark as those on the sections of the shopping card, substantially as set forth.

3. The combination with a pocket of a shopping card, a voucher, the said voucher and shopping card being each secured to the pocket, and a series of gummed stickers secured to the pocket, the said stickers, shopping card and voucher all bearing the same designating mark, substantially as set forth.

HUGO WITTMAN.

Witnesses:
CHARLES KUHN,
NORBERT C. KROPP.